United States Patent [19]
Meier et al.

[11] Patent Number: 5,668,204
[45] Date of Patent: Sep. 16, 1997

[54] STABILIZATION OF POLYCARBONATES HAVING HIGH HEAT DISTORTION TEMPERATURES

[75] Inventors: Helmut-Martin Meier, Ratingen; Uwe Westeppe, Mettmann; Rolf Dhein; Dieter Freitag, both of Krefeld; Dieter Constant, Leverkusen, all of Germany

[73] Assignee: Bayer Aktiengesellschaft, Leverkusen, Germany

[21] Appl. No.: 853,670

[22] Filed: Mar. 19, 1992

[30] Foreign Application Priority Data

Mar. 26, 1991 [DE] Germany .................. 41 09 810.2
Jun. 7, 1991 [DE] Germany .................. 41 18 705.9

[51] Int. Cl.$^6$ .................. C08J 5/10; C08K 5/54; C08L 69/00
[52] U.S. Cl. .................. 524/267; 524/265; 524/266; 525/100; 525/464
[58] Field of Search .................. 524/265, 266, 524/267, 268; 525/63, 100, 101, 147, 464, 474; 528/33, 43, 204

[56] References Cited

U.S. PATENT DOCUMENTS

| | | | |
|---|---|---|---|
| 2,999,835 | 9/1961 | Goldberg | 260/42 |
| 4,130,530 | 12/1978 | Mark et al. | 260/29.1 SB |
| 4,147,707 | 4/1979 | Alewelt et al. | 260/37 SB |
| 4,197,384 | 4/1980 | Bialous et al. | 525/464 |
| 4,221,728 | 9/1980 | Jaquiss et al. | 260/37 SB |
| 4,342,681 | 8/1982 | Idel et al. | 524/108 |
| 4,375,525 | 3/1983 | Idel et al. | 524/108 |
| 5,025,065 | 6/1991 | Tacke et al. | 524/611 |
| 5,068,302 | 11/1991 | Horlacher et al. | 528/21 |
| 5,100,960 | 3/1992 | Grigo et al. | 525/92 |
| 5,104,945 | 4/1992 | Eckel et al. | 525/464 |
| 5,109,076 | 4/1992 | Freitag et al. | 525/464 |

FOREIGN PATENT DOCUMENTS

| | | |
|---|---|---|
| 1116331 | 1/1982 | Canada. |
| 1441367 | 6/1976 | United Kingdom. |
| 2057464 | 4/1981 | United Kingdom. |

OTHER PUBLICATIONS

Patent Abstracts of Japan, Band 11, Nr. 379 (C–463) (2826), Dec. 10, 1987; & JP-A-62 148 560 (Mitsubishi Chem. Ind. Ltd) Jul. 2, 1987.

*Primary Examiner*—Paul R. Michl
*Assistant Examiner*—U. K. Rajguru
*Attorney, Agent, or Firm*—Joseph C. Gil; Aron Preis

[57] ABSTRACT

A thermoplastic molding composition containing an aromatic polycarbonate and a particular siloxane compound is disclosed. The composition which is based on a polycarbonate resin having bifunctional structural units corresponding to formula (Ia)

$$\left[ -O-\underset{R^2}{\underset{|}{\overset{R^1}{\overset{|}{\bigcirc}}}}-\underset{(X)_m}{C}-\underset{R^2}{\underset{|}{\overset{R^1}{\overset{|}{\bigcirc}}}}-O-\underset{O}{\overset{\|}{C}}- \right] \quad (Ia)$$

wherein
$R^1$ and $R^2$ denote, independently of one another, hydrogen, halogen, $C_1$–$C_8$ alkyl, $C_5$–$C_6$-cycloalkyl, $C_6$–$C_{10}$-aryl, or $C_7$–$C_{12}$-aralkyl,
m is an integer from 4 to 7,
$R^3$ and $R^4$ selected individually for each X, denote, independently of one another, hydrogen or $C_1$–$C_6$-alkyl, and
X stands for carbon,
under the condition that $R^3$ and $R^4$ are both alkyl groups on at least one X atom, and
contains from 0.001 to 1% by weight of at least one siloxane corresponding to formula (II)

$$B-\underset{R}{\underset{|}{\overset{R}{\overset{|}{Si}}}}O-\left[\underset{R}{\underset{|}{\overset{R}{\overset{|}{SiO}}}}\right]_r-\left[\underset{A}{\underset{|}{\overset{R}{\overset{|}{SiO}}}}\right]_s-\left[\underset{H}{\underset{|}{\overset{R}{\overset{|}{SiO}}}}\right]_t-\underset{R}{\underset{|}{\overset{R}{\overset{|}{Si}}}}-B, \quad (II)$$

wherein
R denotes hydrogen, $C_1$–$C_{20}$-alkyl, $C_6$–$C_{10}$-aryl or $C_1$–$C_{10}$-alkoxy,
B denotes R or A,
r, s and t independently denote an integer from 0 to 200, or to formula (III)

$$\left( \left[\underset{R}{\underset{|}{\overset{R}{\overset{|}{SiO}}}}\right]_u-\left[\underset{A}{\underset{|}{\overset{R}{\overset{|}{SiO}}}}\right]_v-\left[\underset{H}{\underset{|}{\overset{R}{\overset{|}{SiO}}}}\right]_w \right), \quad (III)$$

wherein
R has the same meaning as in formula (II)
u denotes an integer from 1 to 20, and v and w denote an integer from 0 to 20,
and wherein the sum u+v+w is greater than 3, and
A denotes a $C_1$–$C_{20}$-alkyl group or a $C_6$–$C_{10}$-aryl group is characterized in its improved heat distortion temperature and good aging properties.

11 Claims, No Drawings

STABILIZATION OF POLYCARBONATES HAVING HIGH HEAT DISTORTION TEMPERATURES

FIELD OF THE INVENTION

The invention concerns thermoplastic polycarbonate molding compositions and more particularly to compositions having an improved impact performance.

SUMMARY OF THE INVENTION

A thermoplastic molding composition containing an aromatic polycarbonate and a particular siloxane compound is disclosed. The composition which is based on a polycarbonate resin having bifunctional structural units corresponding to formula (Ia)

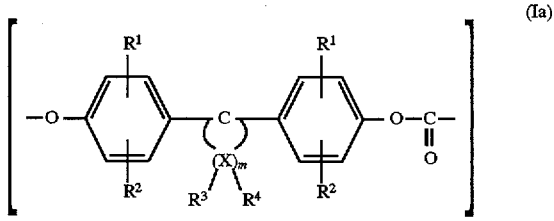

wherein $R^1$ and $R^2$ denote, independently of one another, hydrogen, halogen, $C_1$–$C_8$ alkyl, $C_5$–$C_6$-cycloalkyl, $C_6$–$C_{10}$-aryl, or $C_7$–$C_{12}$-aralkyl, m is an integer from 4 to 7, $R^3$ and $R^4$ selected individually for each X, denote, independently of one another, hydrogen or $C_1$–$C_6$-alkyl, and X stands for carbon, under the condition that $R^3$ and $R^4$ are both alkyl groups on at least one X atom, and contains from 0.001 to 1% by weight of at least one siloxane corresponding to formula (II)

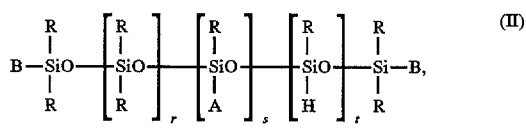

wherein

R denotes hydrogen, $C_1$–$C_{20}$-alkyl, $C_6$–$C_{10}$-aryl or $C_1$–$C_{10}$-alkoxy, B denotes R or A, r, s and t independently denote an integer from 0 to 200, or

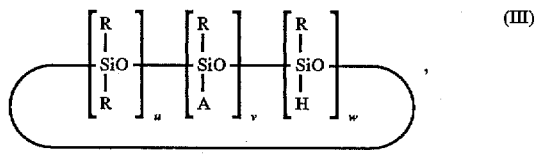

wherein

R has the same meaning as in formula (II)

u denotes an integer from 1 to 20, and v and w denote an integer from 0 to 20, and wherein the sum u+v+w is equal to or greater than 3, and A denotes a $C_1$–$C_{20}$-alkyl group or a $C_6$–$C_{10}$-aryl group is characterized in its improved heat distortion temperature and good aging properties.

BACKGROUND OF THE INVENTION

Monomeric siloxanes in conventional polycarbonates are disclosed in DOS 2,920,450. Oligomeric siloxanes in conventional polycarbonates are disclosed in DOS 2,832,342. Cyclic siloxanes in conventional polycarbonates are disclosed in DOS 2,832,339. Vinyl polymers containing silicon epoxide in filled conventional polycarbonates are disclosed in DOS 2,327,014 (LeA 15 025). No improvement in impact strength in the course of long term aging is observed in these products. Glass fiber reinforced polycarbonates with improved mechanical properties obtained by the addition of organopolysiloxanes are disclosed in DE-OS 2 518 287 (Le A 16 254) Polycarbonates corresponding to structural formulae (Ia) are not mentioned there. DE-OS 2,920,451 (Le A 19 567) discloses the use of organic silicon compounds in combination with oxetane compounds, dioxanes or tetrahydrofurans for the stabilization and brightening of polycarbonates. Polycarbonates corresponding to structural formulae (Ia) are again not mentioned there.

Mixtures of polycarbonates with organopolysiloxanes characterized inter alia by improved toughness are disclosed in U.S. Pat. No. 2,999,835. Nothing in the reference appears to suggest the improved resistance to thermally induced degradation which characterize the presently claimed compositions.

Lastly, mixtures of polydiorganosiloxane-polycarbonate block cocondensates with siloxanes and with graft polymers and/or with rubber elastic polymers are disclosed in DE-OS 3 908 038 (Le A 26 235). Such mixtures have improved resistance to petroleum hydrocarbons and good low temperature toughness.

DETAILED DESCRIPTION OF THE INVENTION

The aromatic polycarbonates of the present invention have high heat distortion temperatures and weight average molecular weights (Mw) of at least 10,000, preferably from 10,000 to 200,000 and in particular from 20,000 to 80,000, and are characterized in having bifunctional carbonate structural units corresponding to formula (Ia)

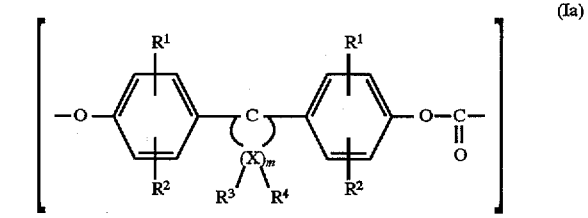

wherein $R^1$ and $R^2$ denote, independently of one another, hydrogen, halogen, preferably chlorine or bromine, $C_1$–$C_8$ alkyl, $C_5$–$C_6$-cycloalkyl, $C_6$–$C_{10}$-aryl, preferably phenyl, or $C_7$–$C_{12}$-aralkyl, preferably phenyl-$C_1$–$C_4$-alkyl, in particular benzyl, m stands for an integer from 4 to 7, preferably 4 or 5, the $R^3$'s and $R^4$'s, which are selected individually for each X, denote, independently of one another, hydrogen or $C_1$–$C_6$-alkyl, and X stands for carbon, under the condition that $R^3$ and $R^4$ are both alkyl groups on at least one X atom.

The polycarbonates based on the carbonate structural units of formula (Ia) are known from DE-OS 3,832,396.

They are homopolycarbonates or copolycarbonates containing the structures corresponding to formula (Ia) in quantities of from 100 mol-% to 2 mol-%, preferably from 100 mol-% to 5 mol-%, in particular from 100 mol-% to 10 mol-%, most preferably from 100 mol-% to 20 mol-% in the polycarbonate, based in each case on the total 100 mol-% of difunctional carbonate structural units.

In formula (Ia), $R^3$ and $R^4$ are preferably both alkyl on one or two X atoms, in particular on only one X atom. The preferred alkyl group is methyl. The X atoms in the α-position to the diphenyl substituted carbon atom (C-1) are preferably not dialkyl substituted but alkyl disubstitution is preferred in the β-position to C-1.

Structural units corresponding to formula (Ia) may in particular be dihydroxydiphenyl cycloalkane groups having 5 or 6 ring carbon atoms in the cycloaliphatic residue, such as These polycarbonates thus contain other difunctional carbonate structural units in the quantity required to make up the 100 mol-%, for example, carbonate structural units corresponding to formula (Ib)

$$\left[ O-Z-O-\underset{\underset{O}{\|}}{C} \right]$$ (Ib)

wherein

Z denotes an aromatic group having 6–30 carbon atoms, in other words, in quantities of from 0 mol-% (inclusive) to 98 mol-% (inclusive), preferably from 0 mol-% to 95 mol-% and in particular from 0 mol-% to 90 mol-%, most preferably from 0 mol-% to 80 mol-%, based in each case on the total 100 mol-% of difunctional carbonate structural units in the polycarbonate.

Preferred polycarbonates include those in which the structural units corresponding to formula (Ia) correspond to formula (Ic)

wherein $R^1$ and $R^2$ have the meanings indicated for formula (Ia), but hydrogen is particularly preferred.

The composition of the invention contains from 0.001 to 1% by weight, preferably from 0.01 to 0.5% by weight, of at least one siloxane corresponding to formula (II)

$$B-SiO\begin{bmatrix} R \\ | \\ SiO \\ | \\ R \end{bmatrix}_r \begin{bmatrix} R \\ | \\ SiO \\ | \\ A \end{bmatrix}_s \begin{bmatrix} R \\ | \\ SiO \\ | \\ H \end{bmatrix}_t \begin{matrix} R \\ | \\ Si-B, \\ | \\ R \end{matrix}$$ (II)

wherein

R denotes hydrogen, $C_1$–$C_{20}$-alkyl, $C_6$–$C_{10}$-aryl or $C_1$–$C_{10}$-alkoxy, B denotes R or A, r stands for zero or an integer from 1 to 200, s stands for zero or an integer from 1 to 200 and t stands for zero or an integer from 1 to 200 and/or to formula (III)

$$\left( \begin{bmatrix} R \\ | \\ SiO \\ | \\ R \end{bmatrix}_u \begin{bmatrix} R \\ | \\ SiO \\ | \\ A \end{bmatrix}_v \begin{bmatrix} R \\ | \\ SiO \\ | \\ H \end{bmatrix}_w \right),$$ (III)

wherein

R has the same meaning as in formula (II)

u stands for an integer from 1 to 20, v stands for zero or an integer from 1 to 20, w stands for zero or an integer from 1 to 20 and u+v+w≧3, and A denotes a $C_1$–$C_{20}$-alkyl group or a $C_6$–$C_{10}$-aryl group optionally containing hetero atoms or epoxy or oxetane groups, optionally in mixtures with oxetanes and/or epoxides.

The present invention also relates to the use of the siloxanes corresponding to formulae (II) and/or (III) as impact strength modifiers for polycarbonates with high heat distortion temperatures based on the structural units corresponding to formula (Ia).

The siloxanes corresponding to formulae (II) and (III) may be used singly or as mixtures of siloxanes of the same formula or mixtures of siloxanes of both formula (II) and formula (III).

Examples of suitable siloxanes corresponding to formula (II) include polysiloxanes having the following parameters:

R=hydrogen, methyl, ethyl, propyl, butyl, octyl, isooctyl, 2-ethylhexyl, phenyl or naphthyl, B=R or A, r=0–100, s=0–100 and t=0–100.

Particularly suitable siloxanes corresponding to formula (II) are those in which R=$CH_3$ or $C_6H_5$,

B=R, r=0–50, s=0–50 and t=0–50, and

A=γ-glycidoxypropyl, 4,5-epoxypentyl, γ-glycidoxybutyl, γ-glycidoxyhexyl, γ-glycidoxyoctyl, glycidoxy-o, p-phenyl, 5,6-epoxyhexyl, 7,8-epoxyoctyl, 9,10-epoxydecyl, β-3,4-(epoxycyclohexyl)

-ethyl, β-3,4(epoxycyclohexyl)propyl, oxiranyl or groups corresponding to the following structure $$-O-CH_2-\underset{\underset{O}{\underline{\phantom{xx}}}}{\overset{R5}{\underset{|}{C}}}\rceil$$

wherein $R^5$=hydrogen, methyl, ethyl, pentyl, hexadecyl, octadecyl, cyclohexyl, phenyl, p-tolyl, benzyl, methoxymethyl, ethoxymethyl, octadecyloxymethyl, phenoxymethyl, p-tolyloxymethyl, benzyloxymethyl, phenoxy, p-chlorophenoxy, p-tert.-butylphenoxy or acetyloxymethyl.

Siloxanes corresponding to formula (II) in which R=CH$_3$ or C$_6$H$_5$, r=0–50, s=0, t=0 and B=R and those in which R=CH$_3$ or C$_6$H$_5$, r=0, s=0, t=0–50 and B=R are also particularly suitable.

Examples of suitable siloxanes corresponding to formula (III) include cyclic siloxanes having the following parameters:

R=methyl, ethyl, propyl, butyl, octyl, isooctyl, 2-ethylhexyl, phenyl or naphthyl, u=1–10, v=0–10, w=0–10 and u+v+w=3–10 and A=R or A=γ-glycidoxypropyl, 4,5-epoxypentyl, γ-glycidoxybutyl, γ-glycidoxyhexyl, γ-glycidoxyoctyl, glycidoxy-o, p-phenyl, 5,6-epoxyhexyl, 7,8-epoxyoctyl, 9,10-epoxydecyl, β-3,4-(epoxycyclohexyl)-ethyl, β-3,4-(epoxycyclohexyl)propyl, oxiranyl and groups having the following structure $$-O-CH_2-\underset{\underset{O}{\underline{\phantom{xx}}}}{\overset{R_5}{\underset{|}{C}}}\rceil$$

wherein $R^5$=hydrogen, methyl, ethyl, pentyl, hexadecyl, octadecyl, cyclohexyl, phenyl, p-tolyl, benzyl, methoxymethyl, ethoxymethyl, octadecyloxymethyl, phenoxymethyl, p-tolyloxymethyl, benzyloxymethyl, phenoxy, p-chlorophenoxy, p-tert.-butylphenoxy or acetyloxymethyl.

Particularly suitable cyclic siloxanes corresponding to formula (III) have the following parameters:

R=CH$_3$ or C$_6$H$_5$, u=1–10, v=0, w=0 or

R=CH$_3$ or C$_6$H$_5$, u=1–10, v=0 and w=0–10, and u+v+w=3–10 and A=R or

A=γ-glycidoxypropyl, 4,5-epoxypentyl, γ-glycidoxybutyl, γ-glycidoxyhexyl, γ-glycidoxyoctyl, glycidoxy-o, p-phenyl, 5,6-epoxyhexyl, 7,8-epoxyoctyl, 9,10-epoxydecyl, β-3,4-(epoxycyclohexyl) ethyl, β-3,4-(epoxycyclohexyl)propyl, oxiranyl or groups having the following structure:

$$-O-CH_2-\underset{\underset{O}{\underline{\phantom{xx}}}}{\overset{R5}{\underset{|}{C}}}\rceil$$

wherein $R^5$=hydrogen, methyl, ethyl, pentyl, hexadecyl, octadecyl, cyclohexyl, phenyl, p-tolyl, benzyl, methoxymethyl, ethoxymethyl, octadecyloxymethyl, phenoxymethyl, p-tolyloxymethyl, benzyloxymethyl, phenoxy, p-chlorophenoxy, p-tert.-butylphenoxy or acetyloxymethyl.

Methods of preparing the compounds corresponding to formulae (II) and (III) to be used according to the invention are known and have been described in W. Noll, Chemie und Technologie der Silicone, publishers Verlag Chemie, Weinheim 1968.

Compounds corresponding to the following formulae are suitable oxetane or epoxide compounds with which the siloxanes of formulae (II) and (III) may be mixed:

α) Mo-3725

$$HO-CH2-\underset{\underset{O}{\underline{\phantom{xx}}}}{\overset{R5}{\underset{|}{C}}}\rceil$$

in which $R^5$ has the meaning indicated above,

β)

$$\left(\underset{O}{\underline{\phantom{xx}}}\overset{R^6}{\underset{|}{\rceil}}-CH_2-O\overset{O}{\overset{\|}{C}}\right)_n R^7$$

wherein $R^6$ denotes C$_{1-C16}$-alkyl and $R^7$ denotes either an n-bonded C$_2$–C$_8$-alkane which may be substituted by OH groups, n being a number from 1–6, or a double bonded cycloalkane, in which case n=2, and

ϑ)

$$\left(\underset{O}{\underline{\phantom{xx}}}\overset{R^6}{\underset{|}{\rceil}}-CH_2-O\right)_m Si(R^8)_r$$

wherein $R^6$ denotes C$_1$–C$_{16}$-alkyl and R8 denotes C$_1$–C$_4$-alkyl optionally substituted by cyano, carboxy or acetoxy, or it denotes alkyl, C$_6$–C$_{14}$-aryl which may be alkyl substituted, C$_7$–C$_{14}$-aralkyl or C$_1$–C$_4$-alkoxy which may be substituted by C$_1$–C$_4$-alkoxy or by allyloxy, m stands for an integer from 1 to 4 and r stands for an integer from 0 to 3 and m+r is always equal to 4, and epoxide group-containing copolymers according to DOS 2,019,325, 3,4-epoxycyclohexylmethyl-3,4-epoxycyclohexane carboxylate and bis-(3,4-epoxycyclohexyl)-adipate.

The molding compositions of the invention exhibit improved resistance to aging effects including a higher retention of optical properties and impact performance.

The incorporation of the siloxanes corresponding to formulae (II) and (III) in the polycarbonates, optionally together with oxetanes and/or epoxides, is carried out in kneaders or extruders. The siloxanes may in many cases be added to the above-mentioned polycarbonates during their preparation or to the starting materials. The siloxanes may also be added to the solutions of the above-mentioned polycarbonates and the solvents may then be evaporated off.

The present invention thus also relates to a process for the preparation of the polycarbonates according to the invention, characterized in that the siloxanes corresponding to formulae (II) and (III) are incorporated in the polycarbonates by means of kneaders or extrudes or added to the starting materials during the preparation of the polycarbonates or added to solutions of the polycarbonates, followed by evaporation of the solvent, oxetanes and/or epoxides being optionally incorporated at the same time.

The polycarbonates may be mixed with the usual additives during or after their preparation. The following are examples of possible additives: Mold release agents, dyes, inorganic pigments, [IV absorbents, flame retardants, stabilizers, fillers such as glass fibers, graphite, metal powders, etc.

Working up of the polycarbonates based on structural units of formula (Ia) which have been modified according to the invention may be carried out, for example, in extruders or kneaders or they may be worked up from solution to produce a wide variety of molded articles such as lamp holders, hollow panels, housings of lighting fittings, writing or recording instruments, water containers, spectacles, baby bottles and films.

The polycarbonate molding compositions according to the invention may be used as molded products wherever known polycarbonates have hitherto been used, i.e. in the electrical industry and in the building industry for coverings and glazings, especially when high dimensional stability under heat is required in combination with good processing properties, in other words for the production of complicated parts having high heat distortion temperatures.

The invention is further illustrated but is not intended to be limited by the following examples in which all parts and percentages are by weight unless otherwise specified.

EXAMPLES

The product investigated was a copolycarbonate based on 1,1-bis-(4-hydroxyphenyl)-3,3,5-trimethylcyclohexane and 2,2-(4-hydroxyphenyl)-propane in a molar ratio of 36:65 having a relative solution viscosity of 1.295 (determined in methylene Chloride at 25° C. and at a concentration of 0.5 gm/100 ml).

Aging tests

The standard test rods of polycarbonates used in Experiments A–C were subjected to hot air aging at 150° C.

The transmission was determined according to ASTM 1003, the yellowness index according to ASTM D 1925 and the impact strength according to DIN 53 453.

Tests according to the invention

The above-mentioned copolycarbonate contained, as additive,

A: 0.1% by weight of a polysiloxane corresponding to formula II wherein

R=CH$_3$, B=CH$_3$, A=

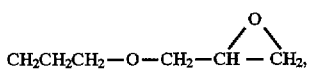

r=0–40, s=0–40 and t=0–40,

B: 0.1% by weight of a 1:1 mixture of

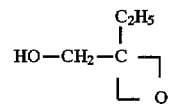

and

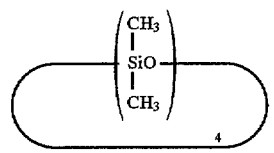

Comparison

C: The above-mentioned copolycarbonate contained no additive. It was re-extruded once. This ensured that the same processing steps were carried out as in A and B.

Test D

The above mentioned copolycarbonate contained as additive 0.03% by weight of the siloxane of the following formula

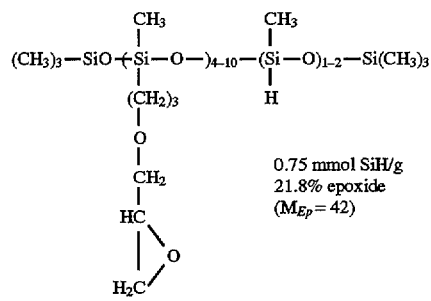

0.75 mmol SiH/g
21.8% epoxide
($M_{Ep}$=42)

This siloxane is prepared from the corresponding methyl hydrogen polysiloxane by reaction with allyl glycidyl ether according to DAS 1,272,550.

The incorporation in the copolycarbonate is carried out in the extruder.

A standard small bar was produced from the additive-containing copolycarbonate.

Test E

The above mentioned copolycarbonate contained as additive 0.03% by weight of the siloxane according to Test D and 0.3% by weight of an UV stabilizer of the formula

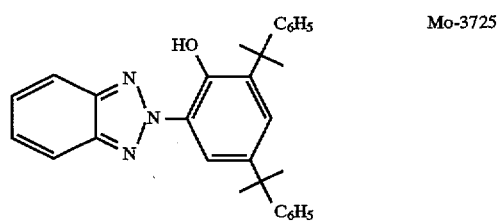

Mo-3725

The incorporation of the additives in the copolycarbonate is carried out in the extruder.

A standard small bar was produced from the additive-containing copolycarbonate.

Results

TABLE I

|  | A | B | C |
|---|---|---|---|
| % Transmission | | | |
| 0 hours | 88.6 | 89.4 | 89.8 |
| 250 | 86.9 | 87.7 | 86.2 |
| 500 | 86.0 | 86.0 | 84.9 |
| 750 | 85.1 | 84.9 | 83.1 |
| 1000 | 85.4 | 84.6 | 82.2 |
| 1250 | 84.3 | 83.5 | 81.1 |
| Y.I. | | | |
| 0 hours | 7.8 | 8.2 | 9.4 |
| 250 | 13.1 | 12.3 | 14.9 |
| 500 | 17.0 | 17.2 | 19.2 |
| 750 | 21.0 | 21.7 | 26.2 |
| 1000 | 19.4 | 21.0 | 30.2 |
| 1250 | 24.5 | 25.4 | 34.9 |

TABLE 2

| Impact strength $a_n$ (kJ/m2) | A | | B | | C | |
|---|---|---|---|---|---|---|
| | n.b. | remainder | n.b. | remainder | n.b. | remainder |
| 0 hours | 10 | | 10 | | 10 | |
| 250 | 8 | 199 | 10 | | 2 | 193 |
| 500 | 9 | 244 | 9 | 119 | 4 | 174 |
| 750 | 9 | 205 | 8 | 235 | 5 | 77 |
| 1000 | 8 | 165 | 8 | 154 | | |
| 1250 | 8 | 113 | 8 | 180 | 1 | 96 | n.b. = not broken
remainder = residual impact strength

What is claimed is:

1. A thermoplastic molding composition consisting of (i) an aromatic polycarbonate resin having a weight average molecular weight of at least 10,000, containing bifunctional carbonate structural units corresponding to formula (Ia)

$$\left[-O-\underset{R^2}{\overset{R^1}{\bigcirc}}-\underset{R^3\ R^4}{\overset{C}{\underset{(X)_m}{\bigcirc}}}-\underset{R^2}{\overset{R^1}{\bigcirc}}-O-\overset{C}{\underset{O}{\parallel}}-\right] \quad (Ia)$$

wherein
$R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl,
m denotes an integer from 4 to 7, and
$R^3$ and $R^4$ are selected individually for each X and denote independently of one another hydrogen or $C_1$–$C_6$-alkyl, and
X denotes carbon,
with the condition that $R^3$ and $R^4$ both denote alkyl on at least one X atom, and (ii) about 0.001 to 1% by weight of at least one siloxane selected from the group consisting of (a) a siloxane corresponding to formula (II) wherein $$B-\underset{R}{\overset{R}{\underset{|}{Si}}}O-\left[\underset{R}{\overset{R}{\underset{|}{Si}}}O\right]_r-\left[\underset{A}{\overset{R}{\underset{|}{Si}}}O\right]_s-\left[\underset{H}{\overset{R}{\underset{|}{Si}}}O\right]_t-\underset{R}{\overset{R}{\underset{|}{Si}}}-B, \quad (II)$$

R is hydrogen, $C_1$–$C_{20}$-alkyl, $C_6$–$C_{10}$-aryl, $C_1$–C10-alkoxy,
B is R or A,
r, s and t independently denote an integer of zero to 200,
and (b) a siloxane corresponding to formula (III)

$$\left(\left[\underset{R}{\overset{R}{\underset{|}{Si}}}O\right]_u-\left[\underset{A}{\overset{R}{\underset{|}{Si}}}O\right]_v-\left[\underset{H}{\overset{R}{\underset{|}{Si}}}O\right]_w\right) \quad (III)$$

wherein
R denotes $C_1$–$C_{20}$-alkyl, $C_6$–$C_{10}$-aryl, $C_1$–$C_{10}$-alkoxy,
u is an integer from 1 to 20,
v and w denote an integer of from zero to 20, and u+v+w≥3, and wherein
A denotes a $C_1$–$C_2O$-alkyl or a $C_6$–$C_{10}$-aryl group.

2. The composition of claim 1 wherein said A contains hetero atoms when A is $C_6$–$C_{10}$-aryl group.

3. The composition of claim 1 wherein said A contains at least one member selected from the group consisting of an epoxy and an oxetane when A is $C_6$–$C_{10}$-aryl group.

4. A thermoplastic molding composition consisting of (i) an aromatic polycarbonate resin having a weight average molecular weight of at least 10,000, containing bifunctional carbonate structural units corresponding to formula (Ia)

$$\left[-O-\underset{R^2}{\overset{R^1}{\bigcirc}}-\underset{R^3\ R^4}{\overset{C}{\underset{(X)_m}{\bigcirc}}}-\underset{R^2}{\overset{R^1}{\bigcirc}}-O-\overset{C}{\underset{O}{\parallel}}-\right] \quad (Ia)$$

wherein
$R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl,
m denotes an integer from 4 to 7, and
$R^3$ and $R^4$, are selected individually for each X and denote independently of one another hydrogen or $C_1$–$C_6$-alkyl, and
X denotes carbon,
with the condition that $R^3$ and $R^4$ both denote alkyl on at least one X atom, and (ii) about 0.001 to 1% by weight of a siloxane corresponding to formula (II)

$$B-\underset{R}{\overset{R}{\underset{|}{Si}}}O-\left[\underset{R}{\overset{R}{\underset{|}{Si}}}O\right]_r-\left[\underset{A}{\overset{R}{\underset{|}{Si}}}O\right]_s-\left[\underset{H}{\overset{R}{\underset{|}{Si}}}O\right]_t-\underset{R}{\overset{R}{\underset{|}{Si}}}-B, \quad (II)$$

wherein
R denotes hydrogen, $C_1$–$C_{20}$-alkyl, $C_6$–$C_{10}$-aryl or $C_1$–$C_{10}$-alkoxy, B is R or A, r, s and t independently denote an integer of zero to 200, and wherein A denotes a $C_1$–$C_{20}$-alkyl or a $C_6$–$C_{10}$-aryl group.

5. A thermoplastic molding composition consisting of
(i) an aromatic polycarbonate resin having a weight average molecular weight of at least 10,000, containing bifunctional carbonate structural units corresponding to formula (Ia)

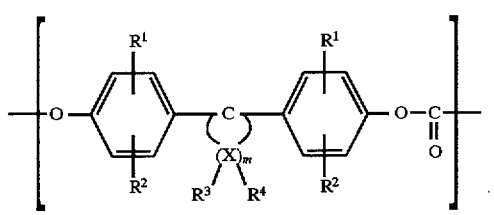

wherein $R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl, m denotes an integer from 4 to 7, and $R^3$ and $R^4$, are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of a siloxane corresponding to formula (III)

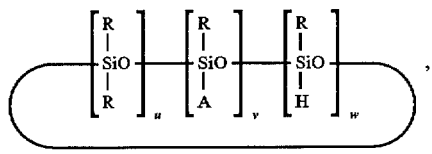

wherein

R is hydrogen, $C_1$–$C_{20}$-alkyl, $C_6$–$C_{10}$-aryl, $C_1$–$C_{10}$-alkoxy, u is an integer from 1 to 20, v and w denote an integer of from zero to 20, and u+v+w≧3, and wherein A denotes a $C_1$–$C_{20}$-alkyl or a $C_6$–$C_{10}$-aryl group.

6. A thermoplastic molding composition comprising
(i) an aromatic polycarbonate resin having a weight average molecular weight of at least 10,000, containing bifunctional carbonate structural units corresponding to formula (Ia)

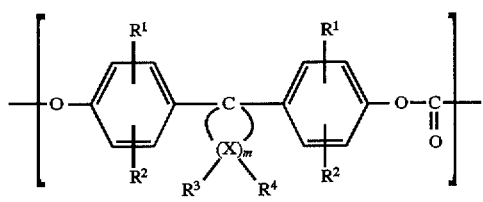

wherein $R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl, m denotes an integer from 4 to 7, and $R^3$ and $R^4$ are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of at least one siloxane selected from the group consisting of (a) a siloxane corresponding to formula (II) wherein

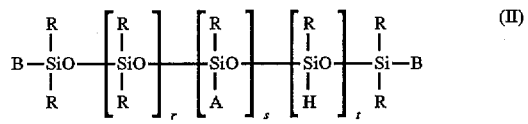

R is hydrogen, $C_1$–$C_{20}$-alkyl, $C_6$–$C_{10}$-aryl, $C_1$–$C_{10}$-alkoxy, B is R or A, r and t independently denote an integer of zero to 200, and s denotes an integer of 1 to 200 and (b) a siloxane corresponding to formula (III)

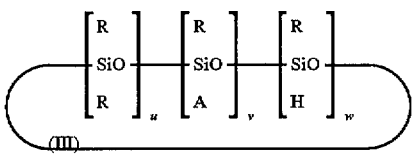

wherein

R denotes $C_1$–$C_{20}$-alkyl, $C_6$–$C_{10}$-aryl, $C_1$–$C_{10}$-alkoxy, u and v independently are integers of from 1 to 20, and w denote an integer of from zero to 20, and u+v+w≧3, and wherein A denotes a hetero atoms-containing aryl group having up to 10 carbon atoms or an alkyl or an aryl group which contains at least one member selected from the group consisting of oxetane or epoxy group wherein said alkyl contains no more than 20 carbon atoms and wherein said aryl contains no more than 10 carbon atoms.

7. A thermoplastic molding composition comprising
(i) an aromatic polycarbonate resin having a weight average molecular weight of at least 10,000, containing bifunctional carbonate structural units corresponding to formula (Ia)

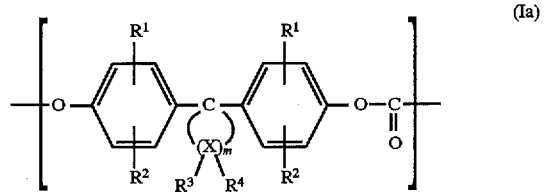

wherein $R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl, m denotes an integer from 4 to 7, and $R^3$ and $R^4$, are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of a siloxane corresponding to formula (II)

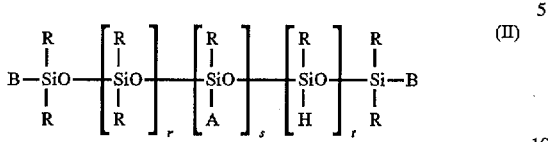

wherein

R denotes hydrogen, $C_1$–$C_{20}$-alkyl, $C_6$–$C_{10}$-aryl or $C_1$–$C_{10}$-alkoxy, B is R or A, r and t independently denote an integer of zero to 200, and wherein s denotes 1 to 200 and A denotes a hetero atoms-containing aryl group having up to 10 carbon atoms or an alkyl or an aryl group which contains at least one member selected from the group consisting of oxetane or epoxy group wherein said alkyl contains no more than 20 carbon atoms and wherein said aryl contains no more than 10 carbon atoms.

8. A thermoplastic molding composition comprising (i) an aromatic polycarbonate resin having a weight average molecular weight of at least 10,000, containing bifunctional carbonate structural units corresponding to formula (Ia)

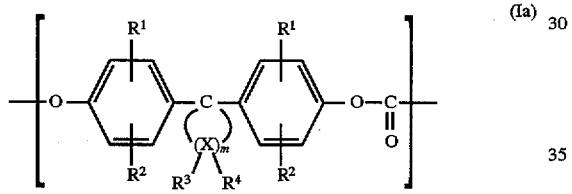

wherein $R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl, m denotes an integer from 4 to 7, and $R^3$ and $R^4$ are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of a siloxane corresponding to formula (III)

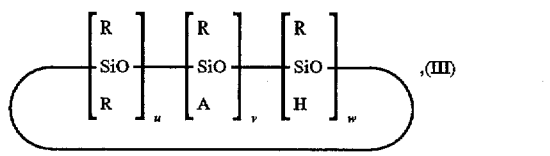

wherein

R is hydrogen, $C_1$–$C_{20}$-alkyl, $C_6$–$C_{10}$-aryl, $C_1$–$C_{10}$-alkoxy, u and v independently are integers of from 1 to 20, and w denote an integer of from zero to 20, and $u+v+w \geq 3$, and wherein A denotes a hetero atoms-containing aryl group having up to 10 carbon atoms or an alkyl or an aryl group which contains a member selected from the group consisting of oxetane or epoxy group wherein said alkyl contains no more than 20 carbon atoms and wherein said aryl contains no more than 10 carbon atoms.

9. A thermoplastic molding composition consisting of (i) an aromatic polycarbonate resin having a weight average molecular weight of at least 10,000, containing bifunctional carbonate structural units corresponding to formula (Ia)

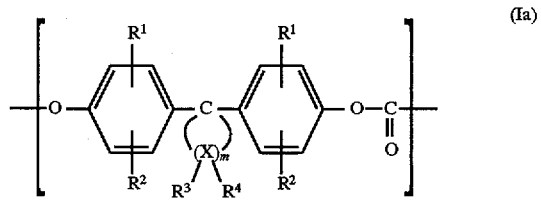

wherein $R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl, m denotes an integer from 4 to 7, and $R^3$ and $R^4$, are selected individually for each X and denote independently of one another hydrogen or $C_1$–$C_6$-alkyl, and X denotes carbon with the condition that $R^3$ and $R^4$ both denote alkyl on at least one X atom, and (ii) about 0.001 to 1% by weight of at least one siloxane selected from the group consisting of (a) a siloxane corresponding to formula (II) wherein

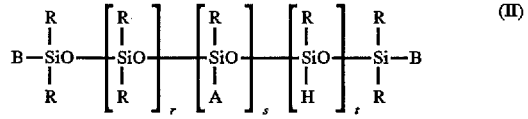

R is hydrogen, $C_1$–$C_{20}$-alkyl, $C_6$–$C_{10}$-aryl, $C_1$–$C_{10}$-alkoxy, B is R or A, r, s and t independently denote an integer of zero to 200.

and (b) a siloxane corresponding to formula (III)

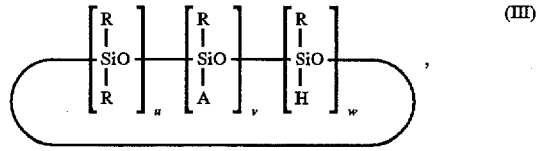

wherein

R denotes $C_1$–$C_{20}$-alkyl, $C_6$–$C_{10}$-aryl, $C_1$–$C_{10}$-alkoxy, u is an integer from 1 to 20, v and w denote an integer of from zero to 20 and $u+v+w \geq 3$, and wherein A denotes a $C_1$–$C_{20}$-alkyl or a $C_6$–$C_{10}$-aryl, and (iii) at least one member selected from the group consisting of mold release agent, dye, pigment, UV-absorber, flame retardant, stabilizer and filler.

10. A thermoplastic molding composition consisting of (i) an aromatic polycarbonate resin having a weight average molecular weight of at least 10,000, containing bifunctional carbonate structural units corresponding to formula (Ia)

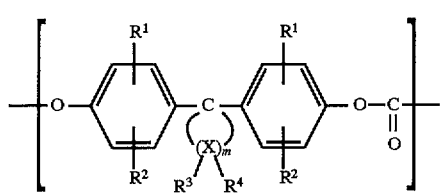

(Ia)

wherein
$R^1$ and $R^2$ denote, indepndently of one another hydrogen, halogen, $C_1$–$C_8$-alkyl, $C_5$–$C_6$-cycloalkyl, $C_6$–$C_{10}$-aryl or $C_7$–$C_{12}$-aralkyl m denotes an integer from 4 to 7, and $R^3$ and $R^4$, are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of a siloxane corresponding to formula (II)

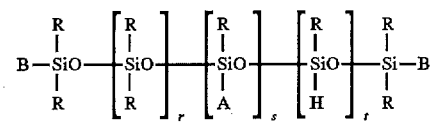

(II)

wherein
R denotes hydrogen, $C_1$–$C_{20}$-alkyl, $C_6$–$C_{10}$-aryl or $C_1$–$C_{10}$-alkoxy, B is R or A, r, s and t independently denote an integer of zero to 200, and wherein A denotes a $C_1$–$C_{20}$-alkyl or a $C_6$–$C_{10}$-aryl group, and (iii) at least one member selected from the group consisting of mold release agent, dye, pigment, UV-absorber, flame retardant, stabilizer and filler.

11. A thermoplastic molding composition consisting of (i) an aromatic polycarbonate resin having a weight average molecular weight of at least 10,000, containing bifunctional carbonate structural units corresponding to formula (Ia)

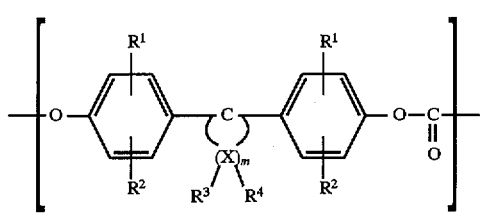

(Ia)

wherein
$R^1$ and $R^2$ denote, independently of one another hydrogen, halogen, $C_1$–$C_8$-alkyl, $C_5$–$C_6$-cycloalkyl, $C_6$–$C_{10}$-aryl or $C_7$–$C_{12}$-aralkyl m denotes an integer from 4 to 7, and $R^3$ and $R^4$, are selected individually for each X and denote independently of one another hydrogen or $C_1$–$C_6$-alkyl, and X denotes carbon, with the condition that $R^3$ and $R^4$ both denote alkyl on at least one X atom, and (ii) about 0.001 to 1% by weight of a siloxane corresponding to formula (III)

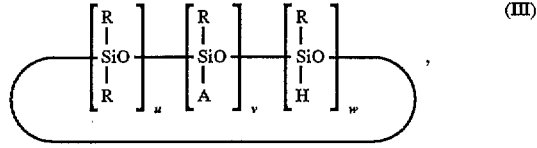

(III)

wherein
R is hydrogen, $C_1$–$C_{20}$-alkyl, $C_6$–$C_{10}$-aryl, $C_1$–$C_{10}$-alkoxy, u is an integer from 1 to 20, v and w denote an integer of from zero to 20, and u+v+w≧3, and wherein A denotes a $C_1$–$C_{20}$-alkyl or a $C_6$–$C_{10}$-aryl group, and (iii) at least one member selected from the group consisting of mold release agent, dye, pigment, UV-absorber, flame retardant, stabilizer and filler.

* * * * *